(12) United States Patent
Chen et al.

(10) Patent No.: US 10,334,428 B1
(45) Date of Patent: Jun. 25, 2019

(54) POWER ON PULLING FOR M2M SIM PROFILE DOWNLOADS

(71) Applicant: Verizon Patent and Licensing Inc., Arlington, VA (US)

(72) Inventors: Zhengfang Chen, Millburn, NJ (US); Musa Kazim Guven, Basking Ridge, NJ (US); Hakan Alparslan, Middletown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 15/875,171

(22) Filed: Jan. 19, 2018

(51) Int. Cl.
*H04W 8/20* (2009.01)
*H04W 52/02* (2009.01)
*H04W 4/70* (2018.01)
*G06F 16/903* (2019.01)

(52) U.S. Cl.
CPC ...... *H04W 8/205* (2013.01); *G06F 16/90335* (2019.01); *H04W 4/70* (2018.02); *H04W 52/0209* (2013.01)

(58) Field of Classification Search
CPC ....... H04W 4/001; H04W 4/003; H04W 4/70; H04W 8/205; H04W 12/06; H04W 24/02; H04W 48/16; H04W 48/18; H04W 52/0209; H04W 74/00; H04W 74/006; H04W 76/00; H04W 76/02; H04W 88/00; H04W 88/02; H04W 88/06; H04W 4/50; H04M 1/72563; H04L 63/0853; H04L 9/32; H04L 9/3234; G06F 17/30979

USPC ......... 455/414.1, 410–411, 418–420, 435.1, 455/456.1–457, 550.1–552.1, 558; 726/1–21

See application file for complete search history.

(56) References Cited

U.S. PATENT DOCUMENTS

| | | | |
|---|---|---|---|
| 9,913,127 B1 * | 3/2018 | Polepalli | H04W 8/183 |
| 2010/0125897 A1 * | 5/2010 | Jain | H04L 63/0272 726/7 |
| 2011/0269421 A1 * | 11/2011 | Moore | H04L 12/14 455/406 |
| 2012/0106533 A1 * | 5/2012 | Chen | H04W 8/205 370/342 |
| 2014/0278402 A1 * | 9/2014 | Charugundla | H04M 7/0024 704/235 |
| 2015/0303966 A1 * | 10/2015 | Lee | H04B 1/3816 455/466 |

(Continued)

*Primary Examiner* — Michael Y Mapa

(57) ABSTRACT

Systems and methods enable remote machine-to-machine device SIM profile management without requiring a mobile terminated SMS wake-up message. A network device stores multiple profile orders for secure elements of end devices and receives an unsolicited profile query from a secure element of an end device. The secure element includes a pre-loaded power-on connection application that automatically initiates an HTTP connection with the network device when the end device is powered on or wakes up from a sleep mode, and the unsolicited profile query includes a secure element identifier. The network device conducts a search to match the secure element identifier from the unsolicited profile query with one of the multiple profile orders for the secure elements and sends profile action instructions to the secure element when there is a match between the secure element identifier from the unsolicited profile query and the one of the multiple profile orders.

20 Claims, 7 Drawing Sheets

(56) References Cited

U.S. PATENT DOCUMENTS

| | | | |
|---|---|---|---|
| 2016/0006728 A1* | 1/2016 | Park | H04L 63/0853 455/411 |
| 2016/0157085 A1* | 6/2016 | Yeoum | H04M 3/387 455/435.1 |
| 2016/0283216 A1* | 9/2016 | Gao | H04W 8/20 |

* cited by examiner

US 10,334,428 B1

POWER ON PULLING FOR M2M SIM PROFILE DOWNLOADS

BACKGROUND

New applications of wireless communication technologies are driving emerging classes of user equipment (UE) devices that may include non-traditional form factors. The so-called "internet of things" (IoT) may include such devices that can be installed and operated at specific locations without the benefit of a traditional user interface (e.g., display, keyboards, buttons, etc.). The IoT can include a class of UE devices called machine-to-machine (M2M) devices that may that exchange data during normal operation without substantial or ongoing interactions with human users. Their form factors and vast numbers make M2M devices ideal candidates for remote SIM (subscriber identity module) provisioning. Today, remote SIM provisioning (or RSP) for M2M devices requires that an RSP platform send a MT (mobile terminated) Class 2 binary short messaging service (SMS) message (referred to herein as an MT SMS) to initiate each remote SIM profile management transaction, such as profile download, enable, disable, or delete transaction.

DETAILED DESCRIPTION OF THE PREFERRED EMBODIMENTS

Figure 1:
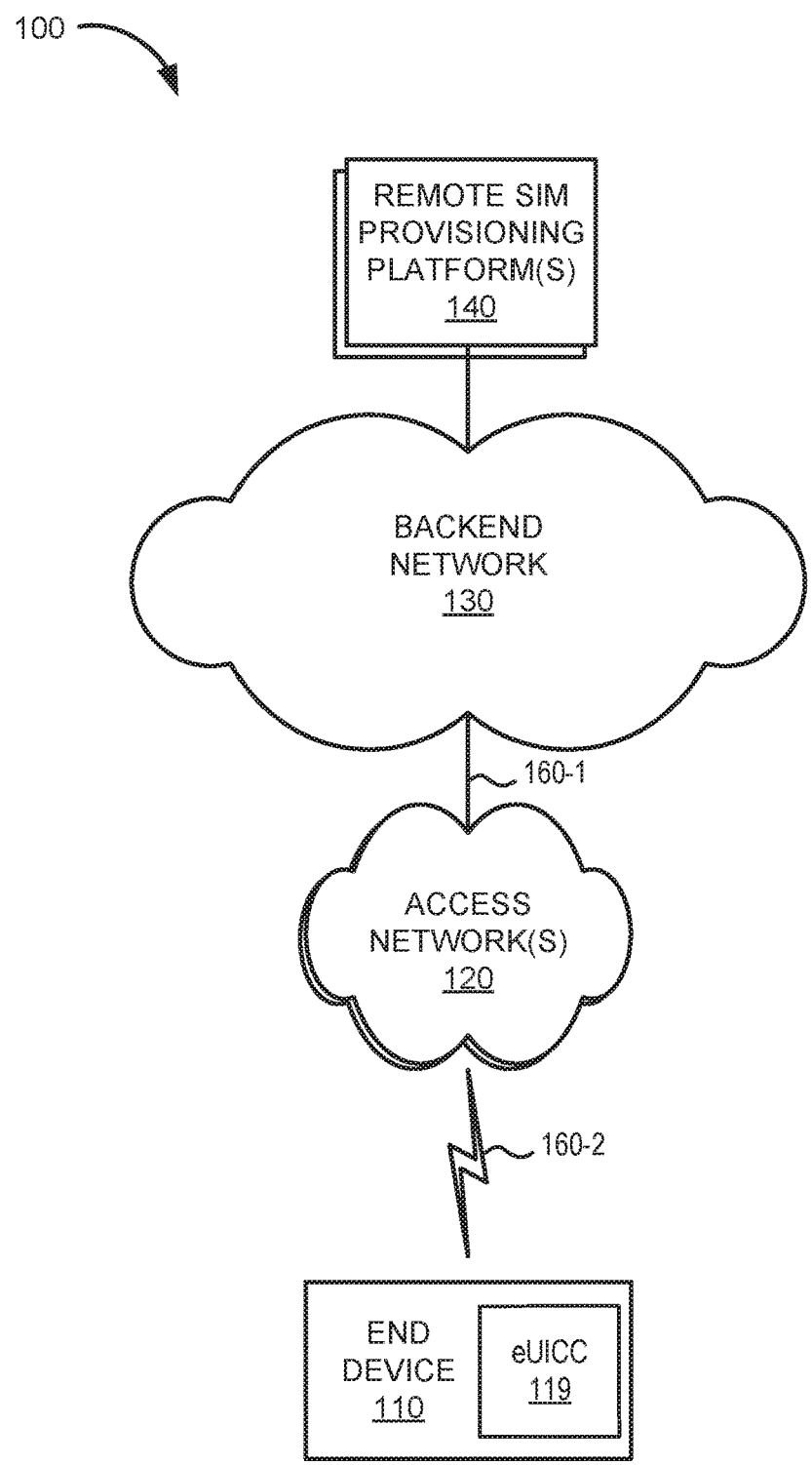
FIG. 1 is a diagram illustrating a network environment according to an implementation described herein.

The following detailed description refers to the accompanying drawings. The same reference numbers in different drawings may identify the same or similar elements.

Some wireless communication standards, such as Global System for Mobile Communications Association (GSMA) standards, define machine-to-machine (M2M) remote SIM provisioning specifications such that any remote SIM management transaction shall be triggered by MT SMS. The MT SMS may be used to wake up the M2M device and/or trigger activity by the M2M device (also referred to herein more generically as an "end device"). The M2M device receives the MT SMS and routes the MT SMS message text to an embedded universal integrated circuit card (eUICC) resident on the M2M device. The eUICC will then respond to the SMS message by either opening a hypertext transfer protocol (HTTP) channel (in the case of profile download) or take actions to enable, disable, or delete a profile accordingly.

The end-to-end path for such a MT SMS wake-up message includes several components, such as a Subscription Manager-Secure Routing (SM-SR) component of the remote SIM provisioning platform (as the message originator), a Short Message Peer-to-Peer (SMPP) Gateway of the lead mobile network operator (MNO), the short message service center (SMSC) that the message is routed to, and the end device/eUICC card. If the MT SMS is a roaming MT SMS, the end-to-end path will also include an inter-carrier messaging platform, an SMPP gateway of an MNO where the end device is roaming, and an SMSC of the MNO where the device is roaming. If the MT SMS is sent to a home network, the end-to-end path will also include another SMSC where the mobile device is assigned/registered.

Reliability issues can arise with so many components involved in the critical end-to-end path to deliver an MT SMS. SMS delivery may not be available whenever one of the above components in the end-to-end path has an issue. Additionally, when an MT SMS is sent to the end device, the end device must be powered up and connected to the network (e.g., an in home network or roaming network). If the end device happens to be powered off and misses the first MT SMS attempt and subsequent SMS retries by the SMSC, the remote SIM provisioning platform will have to repeat an SMS campaign until the end device is powered up and attached to the network. If the MT SMS is not received or missed (due to device being powered off), currently the M2M device and its eUICC will not initiate actions on its own. When MT SMS delivery issues occur, it can be very difficult to troubleshoot due to the many components involved.

Furthermore, different SMS schemes need to be supported for MT SMS delivery. The end device is required to accommodate multiple MNO's network designs. For example, some MNOs deliver SMS over non-access stratum (NAS, a functional layer in the LTE wireless telecom protocol stacks between a core network and mobile device). Conversely, other carriers deliver SMS over an IP Multimedia Subsystem (IMS, an architectural framework for delivering IP multimedia services). Use of NAS requires the end device perform a combined EPS (Evolved Packet System) and IMSI (International Mobile Subscriber Identity) attachment in order for SMS to work, whereas SMS over IMS requires the end device to support SIP (Session Initiation Protocol) registration. The end device must support both of these delivery schemes for the purpose of globalization via remote SIM provisioning using MT SMS triggers. While support for multiple schemes is possible. M2M devices are typically expected to be low-cost, high-reliability devices. Sophisticated device capabilities increase end device development and testing, thus increasing costs and/or lowering reliability.

Thus, implementations described herein provide an improvement to existing M2M remote SIM provisioning platforms by adding M2M-device-initiated profile management without using a Class 2 wake up MT SMS. Implementations described herein enable M2M devices to pull a SIM profile download or other SIM management instructions from an RSP platform. According to one implementation, a method performed by a network device in an RSP platform include storing multiple profile orders for secure elements of end devices; receiving an unsolicited profile query from a secure element of an end device, wherein the secure element includes a pre-loaded power-on connection application that automatically initiates an HTTP connection with the network device when the end device is powered on or wakes up from a sleep mode, and wherein the unsolicited profile query includes a secure element identifier; conducting a search to match the secure element identifier from the unsolicited profile query with one of the multiple profile orders for the secure elements; sending profile action instructions to the secure element when there is a match between the secure element identifier from the unsolicited profile query and the one of the multiple profile orders. The method may also include sending a negative acknowledgement to the secure element when there is not a match between the secure element identifier from the unsolicited profile query and any of the multiple profile orders.

FIG. 1 is a diagram of an exemplary environment 100 in which the systems and/or methods, described herein, may be implemented. As shown in FIG. 1, environment 100 may include an end device 110, one or more access networks 120, a backend network 130, and one or more remote SIM provisioning platforms 140.

End device 110 may include an Internet of Things (IoT) computer device enabled with wireless communication functionality and employing machine-to-machine (M2M) communication. In some implementations, the M2M communication may include Machine-Type Communication (MTC), a type of M2M communication standard developed by 3GPP. In other implementations, the M2M communication may include a different type of communication not tied to a particular standard. For example, end device 110 may include an embedded wireless MTC device that communicates wirelessly with other devices over an M2M interface, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. End device 110 may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device. In some implementations, end device 110 may be configured to remain inactive for extended periods, using features such as Power Saving Mode (PSM) and extended Discontinuous Reception (eDRX).

In other implementations, end device 110 may include a non-IoT/M2M wireless device. For example, end device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface.

According to implementations described herein, end device 110 may include a secure element or SIM, such as an eUICC 119. eUICC 119 includes a platform that hosts an application and stores subscription profiles. eUICC 119 may be embedded or fixed on (e.g., relative to other hardware of end device 110 (e.g., a circuit board, etc.)). eUICC 119 may include various components, such as a processor, a memory, and instructions that provide the multi-active profiles-based network services. According to an exemplary embodiment, eUICC 119 includes a memory that stores a file or an applet (e.g., a container) that includes one or more subscription profiles.

Access network 120 may provide access to backend network 130 for wireless devices, such as end device 110. Access network 120 may enable end device 110 to connect to backend network 130 for mobile telephone service, Short Message Service (SMS) message service, Multimedia Message Service (MMS) message service, Internet access, cloud computing, and/or other types of data services. In one implementation, different access networks may be associated with different MNOs. In some implementations, access network 120 may include a Long Term Evolution (LTE) access network (e.g., an evolved packet core (EPC) network) based on the LTE standard specified by 3GPP. In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 120 may include an LTE Advanced (LTE-A) access network and/or any other advanced network, such as a fifth generation (5G) access network that includes functionality such as carrier aggregation; advanced or massive multiple-input and multiple-output (MIMO) configurations; cooperative MIMO (CO-MIMO); relay stations; heterogeneous networks of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Backend network 130 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Backend network 130 may allow the delivery of Internet Protocol (IP) services to end device 110, and may interface with other external networks. Backend network 130 may include one or more server devices and/or network devices, or other types of computation or communication devices. In some implementations, backend network 130 may include an Internet Protocol Multimedia Sub-system (IMS) network (not separately shown in FIG. 1). An IMS network may include a network for delivering IP multimedia services as specified by 3GPP and may provide media flows between end device 110 and external IP networks or external circuit-switched networks (also not shown in FIG. 1).

Remote SIM provisioning platform 140 may include one or more network devices, or other types of computation or communication devices, to facilitate self-serve personalization and remote provisioning of end device 110. Remote SIM provisioning platform 140 may also include one or more engineering, operation, and inventory databases and systems that maintain and provide information relating to activating and provisioning service orders in network environment 100. Remote SIM provisioning platform 140 may include tools for enabling entry and tracking of customer service orders and may actively transmit information regarding the orders to other systems in network environment 100, such as a billing system (not shown). In some implementations, remote SIM provisioning platform 140 may include inventory information associated with all devices and equipment within environment 100, including end devices 110.

As further illustrated, network environment 100 includes communicative links 160 between the network elements and networks (although only two are referenced in FIG. 1 as links 160-1 and, 160-2). A network element may transmit and receive data via a link 160. Network environment 100 may be implemented to include wireless and/or wired (e.g., electrical, optical, etc.) links 160. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 160 illustrated in environment 100 are exemplary.

Although FIG. 1 shows exemplary components of environment 100, in other implementations, environment 100 may include fewer components, different components, differently-arranged components, or additional functional components than depicted in FIG. 1. Additionally or alternatively, one or more components of environment 100 may perform functions described as being performed by one or more other components of environment 100.

Figure 2:
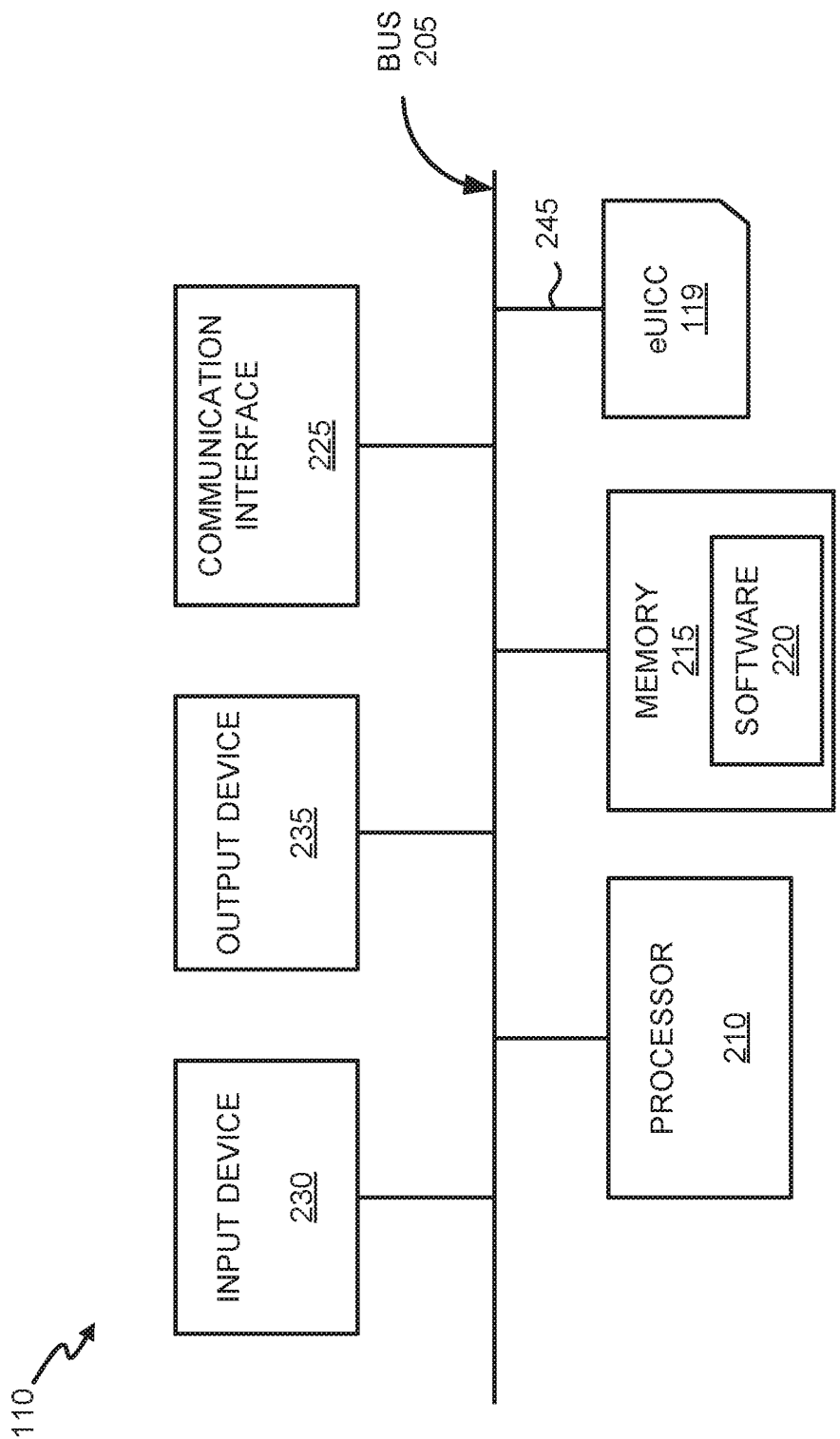
FIG. 2 is a diagram illustrating exemplary logical components of an end device that may be included in a device of FIG. 1.

FIG. 2 is a diagram illustrating exemplary components of end device 110. As illustrated in FIG. 2, according to an exemplary embodiment, end device 110 includes a bus 205, a processor 210, memory/storage 215 that stores software 220, a communication interface 225, an input 230, an output 235, and a secure element interface 245. As further illustrated, end device 110 includes eUICC 119. According to other embodiments, end device 110 may include fewer components, additional components, different components, and/or a different arrangement of components than those illustrated in FIG. 2 and described herein. Additionally, although not illustrated, end device 110 may receive power from an internal and/or external source. For example, end device 110 may include an internal power supply (e.g., rechargeable battery, replaceable battery, etc.), and/or use an external power supply (e.g., an outlet, DC power, etc.).

Bus 205 includes one or multiple paths that permit communication among the components of end device 110. For example, bus 205 may include various types of buses, such as a system bus, an address bus, a data bus, a control bus, etc. Bus 205 may also include other types of components, such as bus drivers, bus arbiters, bus interfaces, clocks, etc.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc.

Processor 210 may control the overall operation or a portion of operation(s) performed by end device 110. Processor 210 may perform one or multiple operations based on an operating system and/or various applications or computer programs (e.g., software 220). Processor 210 may access instructions from memory/storage 215, from other components of end device 110, and/or from a source external to end device 110 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may include a hard disk (e.g., a magnetic disk, an optical disk, a magneto-optic disk, a solid state disk, etc.) and a corresponding drive, a Micro-Electromechanical System (MEMS)-based storage medium, and/or a nanotechnology-based storage medium. Memory/storage 215 may include drives for reading from and writing to the storage medium.

Memory/storage 215 may be external to and/or removable from end device 110, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 215 may store data, software, and/or instructions related to the operation of end device 110.

Software 220 includes an application or a program that provides a function and/or a process. Software 220 is also intended to include firmware, middleware, microcode, hardware description language (HDL), and/or other form of instruction (e.g., libraries, script, module, etc.). Software 220 includes an operating system (OS). For example, depending on the implementation of end device 110, the operating system may correspond to iOS, Android, Windows Phone, Symbian, or another type of operating system (e.g., proprietary, BlackBerry OS, Windows, Linux, Open AT, eCos, etc.). Software 220 may include various end user applications and/or programs, such as a telephone application, a multi-media application, a video call application, and so forth, as previously described. Additionally, according to an exemplary embodiment, software 220 includes one or multiple additional protocol stacks, which when executed by a processor (e.g., processor 210, a baseband processor, etc.) provides multi-active profiles-based network services, as described herein.

Communication interface 225 permits end device 110 to communicate with other devices, networks, systems, and/or the like. Communication interface 225 includes a wireless interface. For example, the wireless interface may support one or multiple short-range wireless access technologies (e.g., Wi-Fi™, Bluetooth™, Zigbee™, etc.) and/or one or multiple long-range wireless access technologies (e.g., LTE, CDMA, GSM, etc.). Communication interface 225 may include a wired interface. For example, the wired interface may support various types of broadband connections, such as cable, fiber optic, Ethernet, Universal Serial Bus (USB), etc. Communication interface 225 may also be configured with a communication interface directed to a global navigational satellite system (GNSS) (e.g., Global Positioning System (GPS) receiver and logic), mobile television, and so forth.

Communication interface 225 includes a transmitter and a receiver, or a transceiver. As previously described, according to an exemplary embodiment, end device 110 is a single radio device. According to an exemplary implementation, the radio frequency logic includes a single transmitter chain and a single receiver chain. According to another exemplary implementation, radio frequency logic includes multiple transmitter chains and receiver chains that operate on the same frequency. Communication interface 225 may include a baseband modem processor that performs baseband/modem functions. Communication interface 225 may operate according to a protocol stack and a communication standard. Communication interface 225 may include various processing logic or circuitry (e.g., multiplexing/de-multiplexing, filtering, amplifying, converting, error correction, etc.). Communication interface 225 includes one or multiple antennas that enable wireless communication. For example, the antenna may be implemented according to various configurations, such as single input single output (SISO), single input multiple output (SIMO), multiple input single output (MISO), or multiple input multiple output (MIMO). The antenna operates according to a frequency band (e.g., 700 MHz, etc.), a communication standard (e.g., an LTE antenna, etc.), and so forth. The antenna may be coupled to long-range wireless access circuitry/logic and/or short-range wireless access circuitry/logic of communication interface 225.

Input 230 permits an input into end device 110. For example, input 230 may include a keyboard, a mouse, a display, a button, a switch, an input port, speech recognition logic, a microphone, a camera, and/or some other type of visual, auditory, tactile, etc., input component. Output 235 permits an output from end device 110. For example, output 235 may include a speaker, a display, a light, an output port, and/or some other type of visual, auditory, tactile, etc., output component. According to some embodiments, input 230 and/or output 235 may each be a device that is attachable to and removable from end device 110.

Secure element interface 245 includes a terminal interface that provides operability and communication between end device 110 and eUICC 119. Depending on the implementation of eUICC 119 (e.g., eUICC, UICC, etc.), secure element interface 245 may comport with a particular terminal interface standard (e.g., 3GPP, GSMA, etc.), a proprietary terminal interface, and so forth.

End device 110 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, end device 110 performs a process described herein based on the execution of hardware (processor 210, etc.). Additionally, or alternatively, end device 110 may perform a process and/or a function based on various combinations of communication interface 225, eUICC 119, processor 210 executing software 220, and so forth.

Figure 3B:
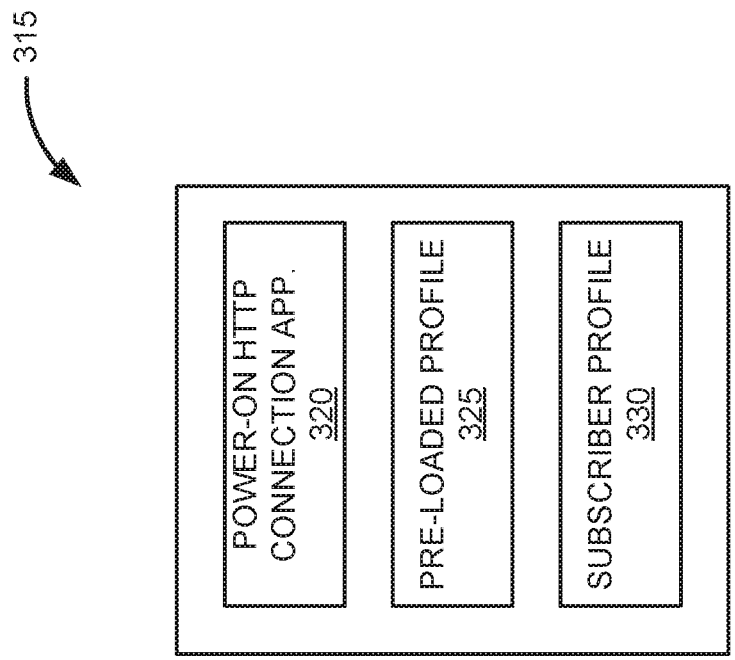
FIGS. 3A and 3B are block diagrams showing exemplary components and a memory layout of a secure element according to an embodiment.
Figure 3A:
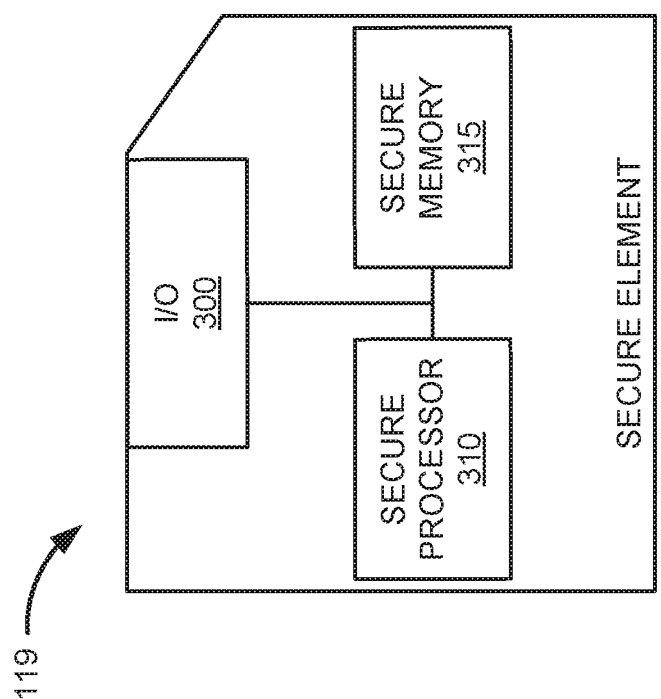

FIG. 3A is a diagram illustrating exemplary components of eUICC 119. As illustrated, eUICC 119 may include input/output circuitry 300, a secure processor 310, and a secure memory 315. Input/output circuitry 300 includes circuitry for inputting data to eUICC 119 from end device 110 (e.g., via bus 205), and circuitry for outputting data from eUICC 119 to end device 110 (e.g., via bus 205). Secure processor 310 may include a processor, a microprocessor, or processing logic that interprets and executes instructions (e.g., software). Secure memory 315 may include a RAM, a ROM, an Electrically Erasable Programmable Read-Only Memory (EEPROM), and/or some other type of memory.

Secure memory 315 stores the file or the applet, which includes a default profile that can be modified or bypassed, as described herein. For example, referring to FIG. 3B, secure memory 315 may store a power-on connection application 320, a pre-loaded subscription profile 325, and a downloaded subscriber profile 330. In one implementation, power-on connection application 320 may initiate an hypertext transfer protocol (HTTP) session with remote SIM provisioning platform 140 whenever end device 110 powers on or is activated from a deep sleep mode. In another implementation, power-on connection application 320 may initiate an HTTP session with remote SIM provisioning platform 140 at a configured interval (e.g., upon power-up after a 24-hour interval from a previous query, every three months, every week, etc.). Power-on connection application 320 may use the HTTP connection to submit a subscriber profile query. In one implementation, the subscriber profile query may include a Mobile Station International Subscriber Directory Number (MSISDN), an eUICC identifier (eID), and/or an international mobile equipment identifier (IMEI) of end device 110. Power-on connection application 320 may initially use default connection information from pre-loaded subscription profile 325.

Pre-loaded subscription profile 325 stores a subscription profile with an address (e.g., a universal resource locator (URL)) to which a profile query can be directed. The address may include an address for eUICC 119 to connect to a component of remote SIM provisioning platform 140. Pre-loaded subscription profile 325 may be configured for an individual customer and loaded on eUICC 119 by an eUICC manufacturer/vendor before end device 110 delivery or sale to an end user. Thus, pre-loaded subscription profile 325 may be configured to individual customer specifications without alteration of other components of end device 110.

Downloaded subscriber profiles 330 may include one or more subscriber profiles that may be downloaded to eUICC 119 after end device 110 enters the marketplace. For example, a downloaded subscriber profile 330 may be received from remote SIM provisioning platform 140. Downloaded subscriber profiles 330 may be enabled, disabled, deleted, etc., based on instructions from remote SIM provisioning platform 140.

Referring back to FIG. 3A, secure memory 315 stores software for execution. For example, memory 315 may store an operating system and other entities (e.g., an applet, a program, an application, etc.) to manage various tasks associated with the storage, access, and use of the subscription profiles. By way of example, memory 315 may store various elements that provide various functions analogous to those set forth in the GSMA specification for eUICC, such as secure storage of subscription profiles, management of the lifecycle of subscription profiles, authentication, an access service to the subscription profiles, and so forth. Additionally, or alternatively, memory 315 may store various elements that provide various functions analogous to those set forth in other specifications, standards, etc. (e.g., an Open Mobile API specification, a GlobalPlatform specification, an International Organization for Standardization (ISO) standard, an International Electrotechnical Commission (IEC) standard, etc.), or various elements of a proprietary nature.

eUICC 119 may perform certain operations or processes in response to secure processor 310 executing software instructions stored in memory 315. According to other exemplary implementations, eUICC 119 may include additional, fewer, and/or different components than those illustrated in FIGS. 3A and 3B. Additionally, or alternatively, the configuration of components of eUICC 119 illustrated in FIGS. 3A and 3B may be different.

Figure 4B:
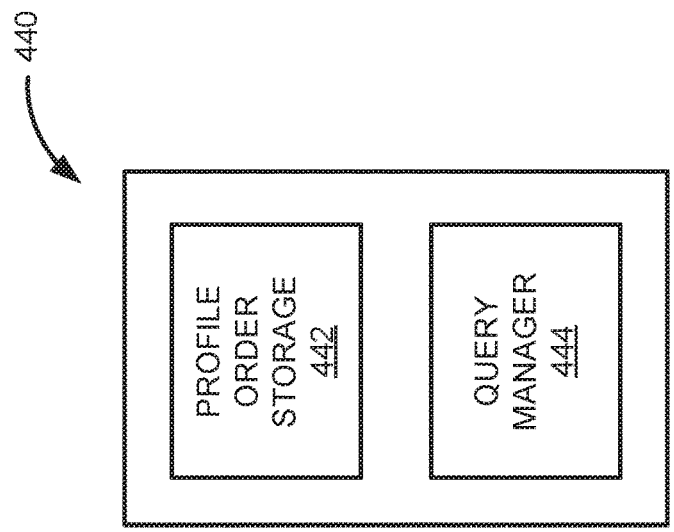
FIGS. 4A and 4B are block diagrams illustrating exemplary logical components of a remote Subscriber Identification Module (SIM) provisioning platform of FIG. 1.
Figure 4A:
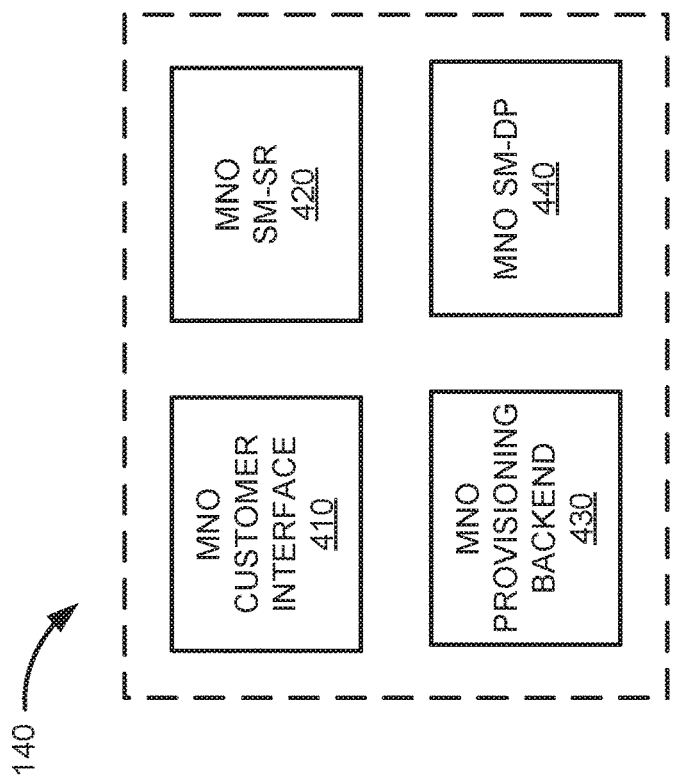

FIG. 4A is a diagram illustrating exemplary components of remote SIM provisioning platform 140. Remote SIM provisioning platform 140 may include a MNO customer interface 410, a MNO subscription manager-secure routing (SM-SR) device 420, a MNO provisioning backend device 430, and a MNO subscription manager-data preparation (SM-DP) device 440. Remote SIM provisioning platform 140 may be implemented according to a centralized computing architecture, a distributed computing architecture, or a cloud computing architecture (e.g., an elastic cloud, a private cloud, a public cloud, etc.). Additionally, network elements of remote SIM provisioning platform 140 may be implemented according to one or multiple network architectures (e.g., a client device, a server device, a peer device, a proxy device, and/or a cloud device). The number of network elements, the number of networks, and the arrangement in remote SIM provisioning platform 140 are exemplary. According to other embodiments, remote SIM provisioning platform 140 may include additional network elements, fewer network elements, and/or differently arranged network elements, than those illustrated in FIG. 4. For example, network elements in remote SIM provisioning platform 140 may be combined in different networks.

MNO customer interface 410 may receive customer orders (e.g., from a customer application server or another customer device) to initiate a SIM profile change. The SIM profile change may include instructions to provide a new SIM profile, enable an existing profile, disable an existing profile, delete an existing profile, etc. MNO customer interface 410 may provide a SIM profile management request to MNO provisioning backend device 430. The SIM profile management request may include an eID and international mobile equipment identifier (IMEI) for the end device 110 to be updated, along with directions for the profile download/update.

MNO SM-SR 420 provides secure transport over the network for subscriber profiles and profile management commands in order to load, enable, disable, and delete subscriber profiles on end device 110. For legacy eUICCs, for example, MNO SM-SR 420 may provide MT SMS triggers to wake up end device 110.

MNO provisioning backend device 430 creates an order based on the profile management request from MNO customer interface 410. For the provided eID, MNO provisioning backend device 430 reserves an integrated circuit card identifier (ICCID) (e.g., a binding process) for the specified SIM profile management request. The ICCID may correspond to a binary image file, which is stored in the SM-DP and will be later downloaded to eUICC 119 if the SIM profile management request includes a profile download. MNO provisioning backend device 430 may also associate the ICCID with an MSISDN for end device 110. MNO provisioning backend device 430 may provide live profile information, such as the MSISDN, the ICCID, the eID, and the IMEI, to MNO SM-DP device 440.

MNO SM-DP device 440 may securely package subscriber profiles to be provisioned on end device 110. A shown in FIG. 4B, MNO SM-DP device 440 may include profile order storage 442 and a query manager 444.

Profile order storage 442 may store profile management orders waiting for delivery to eUICC 119 on end device 110. For example, MNO SM-DP device 440 may receive live profile information from MNO provisioning backend device 430 and store the profile management order in profile order storage 422.

Query manager 444 may listen (or wait) for an HTTP profile query from eUICC 119 (e.g., generate by power-on connection application 320). Query manager 444 may receive the HTTP profile query from eUICC 119 and check if there is a profile management order queued for the device. For example, query manager 444 may detect the eID, IMEI, and/or MSISDN from the HTTP profile query and determine if there a profile management order with a matching eID, IMEI, and/or MSISDN in profile order storage 442. If a matching profile management order is found, query manager 444 may send the appropriate download or command to eUICC 119. For example, query manager may provide a subscriber profile download with an enable command to eUICC 119, using the existing HTTP connection that was established for the subscriber profile query.

Although FIGS. 4A and 4B provides exemplary network elements of remote SIM provisioning platform 140, in other implementations, remote SIM provisioning platform 140 may include more, fewer, or different network elements. For example, in some implementations a single MNO may use one network element to perform multiple communications/functions described in FIGS. 4A and 4B.

Figure 5:
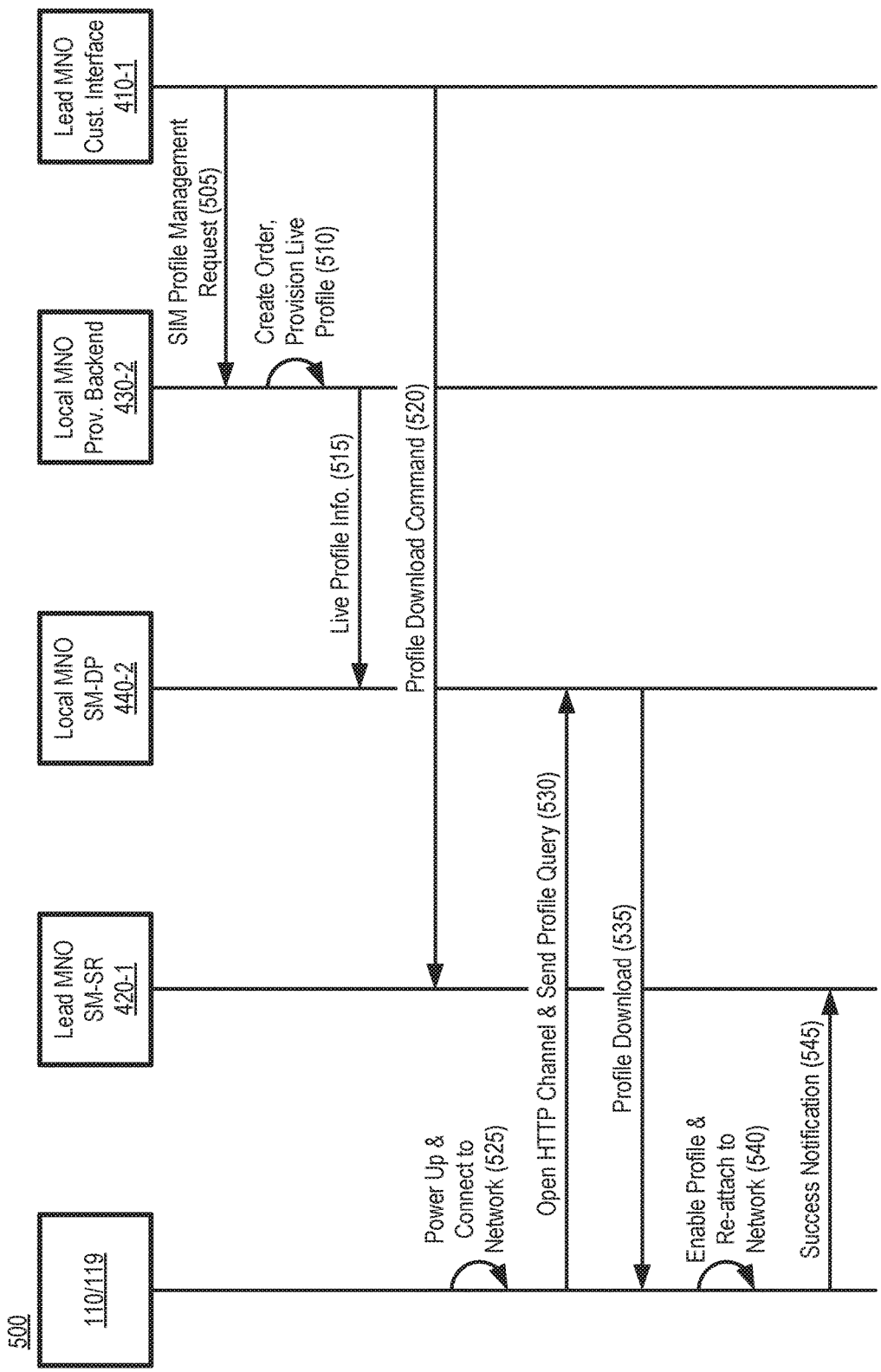
FIG. 5 is a diagram illustrating exemplary communications for implementing a power-on profile query in a portion of the network environment of FIG. 1.

FIG. 5 is a diagram illustrating exemplary communications between devices in a portion 500 of network environment 100. Communications in FIG. 5 represent communications to implement end-device-initiated profile management. As shown in FIG. 5, network portion 500 may include end device 110 with eUICC 119, lead MNO customer interface 410-1, lead MNO SM-SR 420-1, local MNO provisioning backend device 430-2, and local MNO SM-DP device 440-2. For communications in FIG. 5, a customer is providing a new subscriber profile to eUICC 119. Lead MNO customer interface 410-1 and lead MNO SM-SR 420-1 may be associated with one MNO, while local MNO provisioning backend device 430-2 and local MNO SM-DP device 440-2 may be associated with a different MNO. Communications shown in FIG. 5 are simplified for purposes of description, with some exchanges being combined or omitted.

As shown in FIG. 5, a customer may initiate a profile management process by providing an order for a subscriber profile update to lead MNO customer interface 410-1. Lead MNO customer interface 410-1 may receive the customer order, which may include an IMEI and eID for end device 110/eUICC 119. Lead MNO customer interface 410-1 may provide a SIM profile management request 505 to local MNO provisioning backend device 430-2. SIM profile management request 505 may include the IMEI and eID associated with end device 110.

Local MNO provisioning backend device 430-2 may receive SIM profile management request 505. In response, local MNO provisioning backend device 430-2 may create an order and provision the live profile 510, including picking an ICCID and assigning a MSISDN and live service (e.g., voice/messaging/data services) to this ICCID. As indicated by reference 515, local MNO provisioning backend device 430-2 may send the live profile information to local MNO SM-DP device 440-2. Local MNO SM-DP device 440-2 may store the live profile information in profile order storage 442, as described above.

Lead MNO customer interface 410-1 may also send a profile download command 520 to lead MNO SM-SR 420-1. Profile download command 520 may be included to support existing system functionality for sending an MT SMS to end device 110. Although profile download command 520 is not needed for device initiated profile downloads described herein, profile download command 520 may be maintained to allow remote SIM provisioning platform 140 provide both server-initiated and device-initiated profile download capabilities.

At some time after local MNO provisioning backend device 430-2 sends the live profile information 515 to local MNO SM-DP device 440-2, end device 110 may power up and connect to access network 120, as indicated by reference 525. As part of a wake-up sequence, eUICC 119 will execute power-on connection application 320 to automatically open an HTTP channel for profile download purpose between eUICC 119 and remote SIM provisioning platform 140. For example, eUICC 119 may send a profile query 530 to local MNO SM-DP device 440-2. Profile query 530 may include an IMEI and eID for end device 110. Local MNO SM-DP device 440-2 (e.g., query manager 444) may receive profile query 530 and check if there is a profile management order queued (e.g., in profile order storage 442) for end device 110/eUICC 119.

Assuming a profile download order is waiting to be downloaded to end device 110, local MNO SM-DP device 440-2 may provide a profile download 535 using the HTTP connection initiated by eUICC 119. Profile download 535 may include, for example, a subscriber profile and an enable command to be executed by eUICC 119. eUICC 119 may receive profile download 535, enable the new profile, and re-attach to access network 120 (e.g., an access network associated with the lead MNO), as indicated by reference 540. MNO SM-DP device 440-2 may locally update the profile status (e.g. as enabled) after successfully sending the profile action instructions to eUICC 119 so that the profile download order will not be repeated for subsequent profile queries from the same eUICC. When the profile management operation is completed, eUICC 119 may send an acknowledgement notification (e.g., success notification 545) to lead MNO SM-SR 420-1 (e.g., via a new HTTP connection). In one implementation, success notification 545 may be used to support existing system functionality for responding to an MT SMS from lead MNO SM-SR 420-1. In another implementation, success notification 545 may preclude sending a redundant MT SMS from lead MNO SM-SR 420-1 when both server-initiated and device-initiated profile downloads are supported in SIM provisioning platform 140.

Although FIG. 5 provides exemplary communications for implementing end-device-initiated profile management, in other implementations, other communications may be used. For example, communications subscription profiles orders relating to a single MNO may not require communications between a lead MNO and a local MNO.

Figure 6:
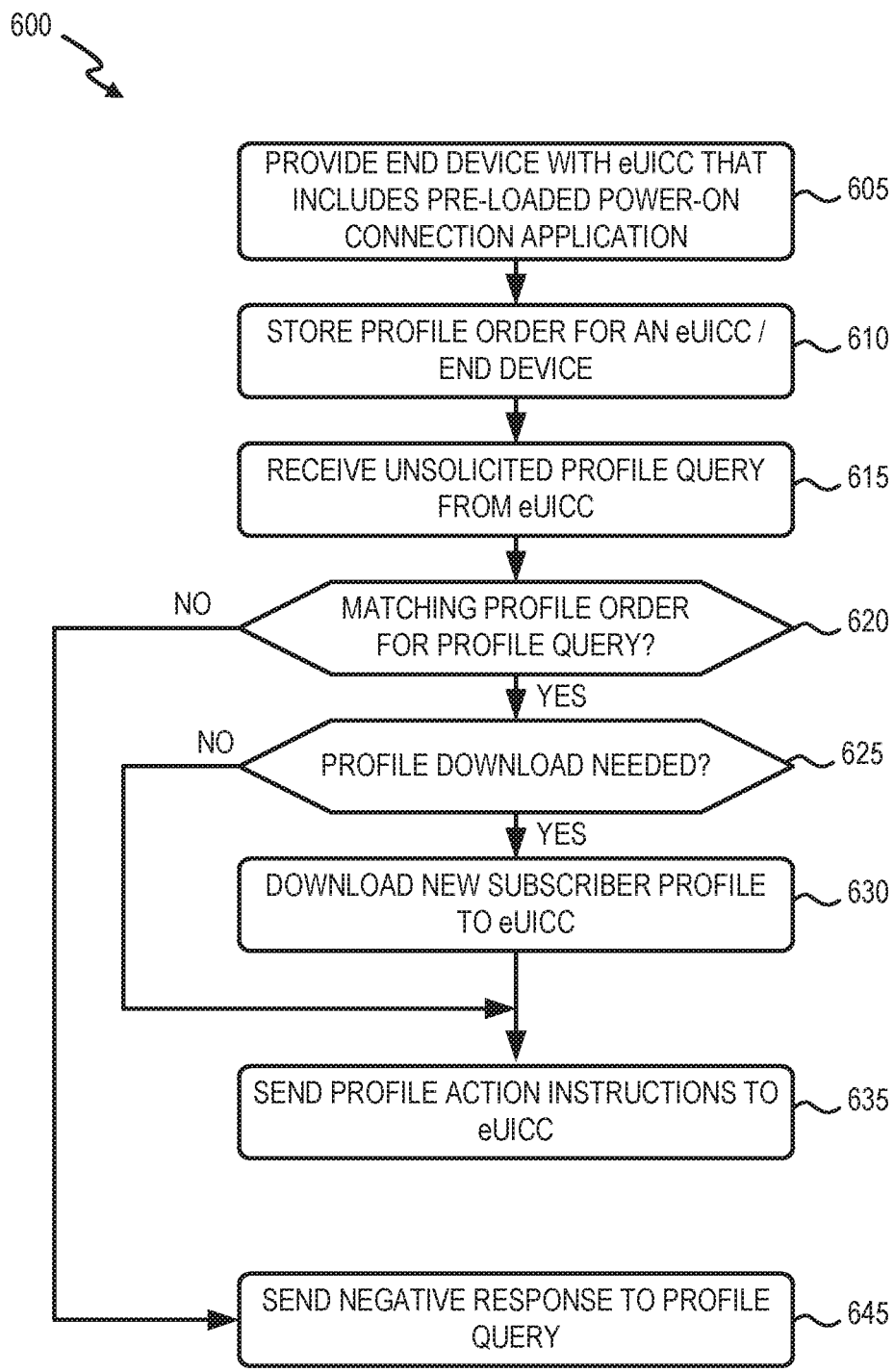
FIG. 6 is a flow diagram illustrating an exemplary process for implementing a power-on profile query, according to an implementation described herein.

FIG. 6 is a flow diagram illustrating an exemplary process 600 for implementing end-device-initiated profile management, according to an implementation described herein. In one implementation, process 600 may be implemented by one or more network elements of remote SIM provisioning platform 140. In another implementation, process 600 may be implemented by remote SIM provisioning platform 140 in conjunction with one or more other devices in network environment 100.

Referring to FIG. 6, process 600 may include providing an end device including an eUICC with a pre-loaded power-on connection application (block 605). For example, eUICC 119 may be configured to customer specifications with a default profile (e.g., pre-loaded profile 325) and power-on HTTP connection application 320. End device 110 may be assembled with eUICC and eventually distributed to a subscriber/user.

Process 600 may also include storing a profile order for an eUICC of an end device (block 610). For example, MNO customer interface 410 may receive customer orders (e.g., from a customer application server or another customer device) to initiate a SIM profile change. The SIM profile change may include instructions to provide a new SIM profile, enable an existing profile, disable an existing profile, delete an existing profile, etc. MNO customer interface 410 may provide a SIM profile management request to MNO provisioning backend device 430. The SIM profile management request may include an eUICC ID (eID) and international mobile equipment identifier (IMEI) for the end device 110 to be updated, along with directions for the profile download/update. MNO SM-DP device 440 may receive live profile information from MNO provisioning backend device 430 and store the profile management order in profile order storage 442.

Process 600 may further include receiving an unsolicited profile query from the eUICC (block 615) and determining if a matching profile order for the profile query exists in the profile order storage (block 620). For example, power-on connection application 320 of eUICC 119 may initiate an HTTP connection with remote SIM provisioning platform 140 whenever end device 110 powers on or is activated from a deep sleep mode. Power-on connection application 320 may use the HTTP connection to submit a subscriber profile query (e.g., profile query 530). The subscriber profile query can be considered unsolicited in that no trigger message (e.g., an MT SMS or other communication) is provided from another network device to initiate the profile query. In one implementation, the subscriber profile query may include an MSISDN, an eID, and/or an IMEI of end device 110. Remote SIM provisioning platform 140 (e.g., query manager 444) may receive the HTTP profile query from eUICC 119 and check if there is a profile management order queued for the device. For example, query manager 444 may detect the eID, IMEI, and/or MSISDN from the HTTP profile query and determine if there a profile management order (e.g., with a matching eID, IMEI, and/or MSISDN) in profile order storage 442.

If there is a matching profile order for the profile query (block 620—Yes), process 600 may include determining if a profile download is needed (block 625). For example, remote SIM provisioning platform 140 (e.g., query manager 444) may determine if the matching profile order includes a download for a new subscriber profile or only instructions/commands to manage an existing subscriber profile on eUICC 119.

If a profile download is needed (block 625—Yes), process 600 may include downloading a new subscriber profile to the eUICC (block 630). For example, if a matching profile management order is found, remote SIM provisioning platform 140 (e.g., query manager 444) may send the appropriate download to eUICC 119 using the existing HTTP connection used to send the subscriber profile query.

If a profile download is not needed (block 625—No) or after downloading a new subscriber profile, process 600 may include sending profile action instructions to the eUICC (block 635). For example, remote SIM provisioning platform 140 (e.g., query manager 444) may send instructions to enable, disable, or delete a profile in accordance with the profile order for eUICC 119.

Returning to block 620, if there is not a matching profile order for the profile query (block 620—No), process 600 may include sending to the eUICC a negative response to the profile query (block 645). For example, if a matching profile management order responsive to the profile query is not found, remote SIM provisioning platform 140 (e.g., query manager 444) may send a message to eUICC 119 of end device 110 indicating there are no profile updates.

Figure 7:
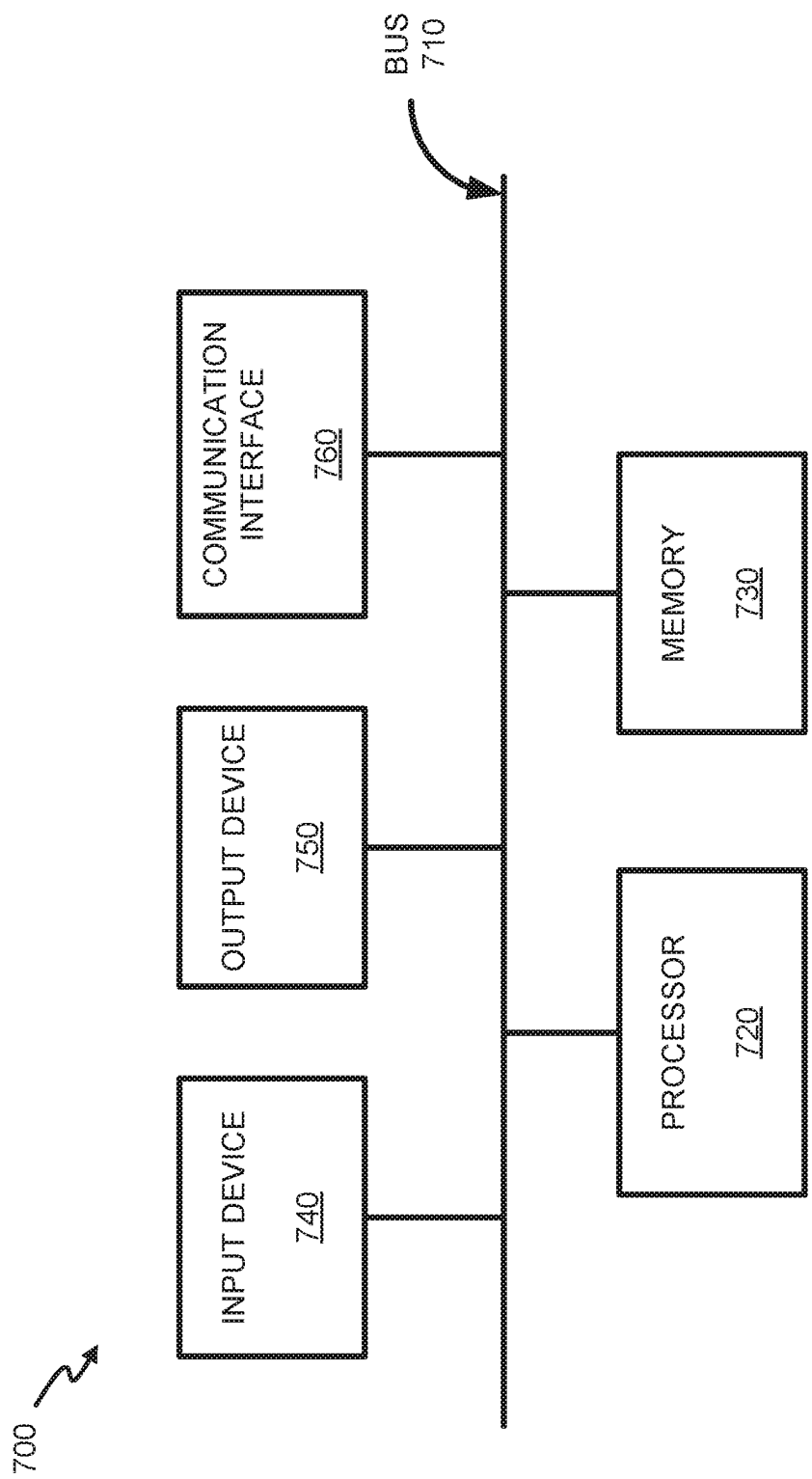
FIG. 7 is a diagram of exemplary components that may be included in one or more of the devices shown in FIGS. 1 and 5.

FIG. 7 is a diagram illustrating example components of a device 700 according to an implementation described herein. Remote SIM provisioning platform 140, MNO customer interface 410, MNO SM-SR 420, MNO provisioning backend device 430, MNO SM-DP device 440, and other devices in network environment 100 may each be implemented in one or more devices 700. As shown in FIG. 7, device 700 may include a bus 710, a processor 720, a memory 730, an input device 740, an output device 750, and a communication interface 760.

Bus 710 may include a path that permits communication among the components of device 700. Processor 720 may include any type of single-core processor, multi-core processor, microprocessor, latch-based processor, and/or processing logic (or families of processors, microprocessors, and/or processing logics) that interprets and executes instructions. In other embodiments, processor 720 may include an application-specific integrated circuit (ASIC), a field-programmable gate array (FPGA), and/or another type of integrated circuit or processing logic.

Memory 730 may include any type of dynamic storage device that may store information and/or instructions, for execution by processor 720, and/or any type of non-volatile storage device that may store information for use by processor 720. For example, memory 730 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 740 may allow an operator to input information into device 700. Input device 740 may include, for example, a keyboard, a mouse, a pen, a microphone, a remote control, an audio capture device, an image and/or video capture device, a touch-screen display, and/or another type of input device. In some embodiments, device 700 may be managed remotely and may not include input device 740. In other words, device 700 may be "headless" and may not include a keyboard, for example.

Output device 750 may output information to an operator of device 700. Output device 750 may include a display, a printer, a speaker, and/or another type of output device. For example, device 700 may include a display, which may include a liquid-crystal display (LCD) for displaying content to the customer. In some embodiments, device 700 may be managed remotely and may not include output device 750. In other words, device 700 may be "headless" and may not include a display, for example.

Communication interface 760 may include a transceiver that enables device 700 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 760 may include a transmitter that converts baseband signals to radio frequency (RF) signals and/or a receiver that converts RF signals to baseband signals. Communication interface 760 may be coupled to an antenna for transmitting and receiving RF signals.

Communication interface 760 may include a logical component that includes input and/or output ports, input and/or output systems, and/or other input and output components that facilitate the transmission of data to other devices. For example, communication interface 760 may include a network interface card (e.g., Ethernet card) for wired communications and/or a wireless network interface (e.g., a Wi-Fi, LTE, etc.) card for wireless communications. Communication interface 760 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form, including logic that supports the generation, transmission and reception of messages in accordance with message format 1100.

As described above, device 700 may perform certain operations relating to implementing a power-on profile query for M2M devices, such as end device 110. Device 700 may perform these operations in response to processor 720 executing software instructions contained in a computer-readable medium, such as memory 730. A computer-readable medium may be defined as a non-transitory memory device. A memory device may be implemented within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of, or in combination with, software instructions to implement processes described herein. Thus, implementations described herein are not limited to any specific combination of hardware circuitry and software.

Although FIG. 7 shows exemplary components of device 700, in other implementations, device 700 may include fewer components, different components, additional components, or differently arranged components than depicted in FIG. 7. Additionally or alternatively, one or more components of device 700 may perform one or more tasks described as being performed by one or more other components of device 700.

Systems and methods described herein may provide remote M2M device SIM profile management without requiring a mobile terminated SMS wake-up message. A network device stores multiple profile orders for secure elements of end devices and receives an unsolicited profile query from a secure element. The secure element includes a pre-loaded power-on connection application that automatically initiates an HTTP connection with the network device when the end device is powered on or wakes up from a sleep mode, and the unsolicited profile query includes a secure element identifier. The network device conducts a search to match the secure element identifier from the unsolicited profile query with one of the multiple profile orders for the secure elements and sends profile action instructions to the secure element when there is a match between the secure element identifier from the unsolicited profile query and the one of the multiple profile orders.

Systems implementing a power-on profile query may resolve problems with unreliable SMS delivery for M2M devices and other end devices. Systems implementing a power-on profile query as described herein may be employed in addition to existing SMS-based notification techniques. Thus, existing MT SMS triggered profile management systems may co-exist to accommodate legacy end devices with eUICCs. Systems changes to accommodate implementing a power-on profile query can be limited to SIM vendors and eUICC remote SIM provisioning platform vendors, which may be the same vendor. Thus, changes can be implemented with little or no impact to end device manufacturers (e.g., original equipment manufacturers (OEMs)) and wireless network operators.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    storing, by a first network device in a remote subscriber identification module (SIM) provisioning platform, multiple profile orders for secure elements of end devices;
    receiving, by the first network device, an unsolicited profile query from a secure element of an end device, wherein the secure element includes a power-on connection application that automatically initiates a first hypertext transfer protocol (HTTP) connection with the first network device when the end device is powered on or wakes up from a sleep mode, and wherein the unsolicited profile query includes a secure element identifier;
    conducting, by the first network device, a search to match the secure element identifier from the unsolicited profile query with one of the multiple profile orders for the secure elements;
    sending, by the first network device, profile action instructions to the secure element when there is a match between the secure element identifier from the unsolicited profile query and the one of the multiple profile orders; and
    receiving, by a second network device in the remote SIM provisioning platform, an acknowledgement notification responsive to the profile action instructions, wherein the acknowledgement notification is received from the secure element via a second HTTP connection with the second network device.

2. The method of claim 1, further comprising:
    monitoring, by the first network device, for incoming unsolicited profile queries.

3. The method of claim 1, wherein the secure element is an embedded universal integrated circuit card (eUICC).

4. The method of claim 3, wherein the end device is a machine-to-machine (M2M) communication device.

5. The method of claim 1, wherein receiving the unsolicited profile query includes:
    receiving an HTTP session setup request from the secure element, and
    receiving the unsolicited profile query via an HTTP session established in response to the HTTP session setup request.

6. The method of claim 1, wherein the unsolicited profile query further includes an international mobile subscriber identity (IMSI) or a mobile station international subscriber directory number (MSISDN) for the end device.

7. The method of claim 1, further comprising:
    locally updating, by the first network device, the status of the one of the multiple profile orders after sending the profile action instructions.

8. The method of claim 7, further comprising:
receiving, by the first network device, another unsolicited profile query from the secure element, wherein the other unsolicited profile query includes the secure element identifier;
conducting, by the first network device, another search to match the secure element identifier from the other unsolicited profile query with one of the multiple profile orders for the secure elements; and
sending, by the first network device, a negative acknowledgement to the secure element when there is not a match between the secure element identifier from the other unsolicited profile query and any of the multiple profile orders.

9. The method of claim 1, wherein the profile order includes an embedded universal integrated circuit card identifier (eID) and one or more of an international mobile equipment identifier (IMEI) or an integrated circuit card identifier (ICCID).

10. The method of claim 1, wherein the first network device includes a local subscription manager-data preparation (SM-DP) function for the remote SIM provisioning platform, and wherein the second network device includes a subscription manager-secure routing (SM-SR) function for the remote SIM provisioning platform.

11. The method of claim 1, wherein the profile action instructions include instructions for the secure element to enable, disable, or delete a subscriber profile.

12. The method of claim 1, further comprising:
receiving, by the second network device, a profile download command, wherein the profile download command prompts sending of a mobile-terminated (MT) short message service (SMS) message to the end device, and wherein the acknowledgement notification precludes sending the MT SMS message.

13. A system, comprising:
a first network device in a remote subscriber identification module (SIM) provisioning platform, the first network device including:
one or more first memories to store instructions; and
one or more first processors to execute the instructions to:
store multiple profile orders for secure elements of end devices;
receive an unsolicited profile query from a secure element of an end device, wherein the secure element includes a pre-loaded power-on connection application that automatically initiates a first hypertext transfer protocol (HTTP) connection with the first network device when the end device is powered on or wakes up from a sleep mode, and wherein the unsolicited profile query includes a secure element identifier;
conduct a search to match the secure element identifier from the unsolicited profile query with one of the multiple profile orders for the secure elements; and
send profile action instructions to the secure element when there is a match between the secure element identifier from the unsolicited profile query and the one of the multiple profile orders; and
a second network device in the remote SIM provisioning platform, the second network device including:
one or more second memories to store instructions; and
one or more second processors to execute the instructions to:
receive an acknowledgement notification responsive to the profile action instructions, wherein the acknowledgement notification is received from the secure element via a second HTTP connection with the second network device.

14. The system of claim 13, wherein the secure element is an embedded universal integrated circuit card (eUICC), and wherein the end device is a machine-to-machine (M2M) communication device.

15. The system of claim 14, wherein, when receiving the unsolicited profile query, the one or more first processors are further to execute the instructions to:
receive a HTTP session setup request from the secure element, and
receive the unsolicited profile query via an HTTP session established in response to the HTTP session setup request.

16. The system of claim 13, wherein the one or more first processors are further to execute the instructions to:
locally update the status of the one of the multiple profile orders after sending the profile action instructions.

17. The system of claim 13, wherein the one or more first processors are further to execute the instructions to:
receive another unsolicited profile query from the secure element, wherein the other unsolicited profile query includes the secure element identifier;
conduct another search to match the secure element identifier from the other unsolicited profile query with one of the multiple profile orders for the secure elements; and
send a negative acknowledgement to the secure element when there is not a match between the secure element identifier from the other unsolicited profile query and any of the multiple profile orders.

18. The system of claim 17, wherein the second network device includes a subscription manager-secure routing (SM-SR) function for the remote SIM provisioning platform.

19. A non-transitory computer-readable medium containing instructions executable by at least one processor, the computer-readable medium comprising one or more instructions to cause the at least one processor to:
store, multiple profile orders for secure elements of end devices;
receive, by a first network function, a profile query from a secure element of an end device, wherein the secure element includes a pre-loaded power-on connection application that automatically initiates a first hypertext transfer protocol (HTTP) connection with the network device when the end device is powered on or wakes up from a sleep mode, and wherein the profile query includes a secure element identifier;
conduct a search to match the secure element identifier from the profile query with one of the multiple profile orders for the secure elements; and
send, by the first network function, profile action instructions to the secure element when there is a match between the secure element identifier from the profile query and the one of the multiple profile orders, wherein the profile action instructions cause the secure element to send to a second network function via a second HTTP connection an acknowledgement notification responsive to the profile action instructions.

20. The non-transitory computer-readable medium of claim 19, further comprising one or more instructions to cause the at least one processor to:

send a negative acknowledgement to the secure element when there is not a match between the secure element identifier from the profile query and any of the multiple profile orders.

* * * * *